United States Patent
Toyoda

(10) Patent No.: US 8,605,171 B2
(45) Date of Patent: Dec. 10, 2013

(54) IMAGE PROCESSING APPARATUS, IMAGING APPARATUS, IMAGE PROCESSING METHOD AND STORAGE MEDIUM STORING IMAGE PROCESSING PROGRAM

(75) Inventor: Tetsuya Toyoda, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 731 days.

(21) Appl. No.: 12/716,886

(22) Filed: Mar. 3, 2010

(65) Prior Publication Data

US 2010/0238324 A1 Sep. 23, 2010

(30) Foreign Application Priority Data

Mar. 17, 2009 (JP) .................................. 2009-64549

(51) Int. Cl.
*H04N 5/222* (2006.01)
*H04N 5/262* (2006.01)

(52) U.S. Cl.
USPC ..................................... 348/239; 348/333.11

(58) Field of Classification Search
USPC ........ 348/222.1, 239, 333.02, 333.01, 333.11
See application file for complete search history.

(56) References Cited

U.S. PATENT DOCUMENTS

| 6,680,749 B1 * | 1/2004 | Anderson et al. ......... 348/231.99 |
| 2005/0140802 A1 * | 6/2005 | Nam .............................. 348/239 |

FOREIGN PATENT DOCUMENTS

| CN | 1638436 | 7/2005 |
| JP | 11-120334 | 4/1999 |
| JP | 2004-228731 | 8/2004 |
| JP | 2005-318347 | 11/2005 |
| JP | 2005-347886 | 12/2005 |
| JP | 2008-211843 | 9/2008 |

OTHER PUBLICATIONS

First Office Action for Chinese Patent Application No. 201010135468.3, mailed Dec. 16, 2011 (3 pgs.) with translation (1 pg.).
Notification of Reason for Refusal for Japanese Patent Application No. 2009-064549, mailed Dec. 18, 2012 (2 pgs.) with translation (3 pgs.).

* cited by examiner

*Primary Examiner* — Timothy J Henn
(74) *Attorney, Agent, or Firm* — Straub & Pokotylo; John C. Pokotylo

(57) ABSTRACT

An image processing apparatus for displaying a live view image obtained by implementing special effect processing on an image data on a monitor comprises an image processing unit that implements a plurality of types of special effect processing on the image data to generate a plurality of sets of special effect image data corresponding respectively to the plurality of types of special effect processing, and a control unit that displays the plurality of sets of special effect image data on the monitor while switching the plurality of sets of special effect image data automatically in time series.

24 Claims, 11 Drawing Sheets

SPECIAL EFFECT PROCESSING 1 | H |
SPECIAL EFFECT PROCESSING 2 | H | S |
SPECIAL EFFECT PROCESSING 3 | H | S |
SPECIAL EFFECT PROCESSING 4 | H | S |
SPECIAL EFFECT PROCESSING 5 | H | S |

*FIG. 6*

IMAGE PROCESSING APPARATUS, IMAGING APPARATUS, IMAGE PROCESSING METHOD AND STORAGE MEDIUM STORING IMAGE PROCESSING PROGRAM

FIELD OF THE INVENTION

This invention relates to a technique for generating and displaying a plurality of special effect image data by implementing a plurality of types of special effect processing on an image data.

BACKGROUND OF THE INVENTION

Techniques for implementing special effect processing such as soft focus and silver film tone on an image data obtained by a digital camera have come to attention in recent years. In another known technique, special effect processing is implemented on a live view image data, whereupon the image data are displayed on a back surface liquid crystal display or the like, thereby allowing a user to check the special effect prior to image pickup. In JP2008-211843A, live view images subjected to a plurality of types of special effect processing are displayed on a monitor in a multi-screen format, thereby allowing the user to check the various types of special effect processing at once.

SUMMARY OF THE INVENTION

An image processing apparatus of an aspect of the present invention for displaying a live view image obtained by implementing special effect processing on an image data on a monitor comprises an image processing unit that implements a plurality of types of special effect processing on the image data to generate a plurality of sets of special effect image data corresponding respectively to the plurality of types of special effect processing, and a control unit that displays the plurality of sets of special effect image data on the monitor while switching the plurality of sets of special effect image data automatically in time series.

An imaging apparatus of another aspect of the present invention comprises an imaging unit that obtains an image data by photographing an object, a display unit that displays the image data, an image processing unit that implements a plurality of types of special effect processing on the photographed image data to generate a plurality of sets of special effect image data corresponding respectively to the plurality of types of special effect processing, and a control unit that displays the plurality of sets of special effect image data on the display unit while switching the plurality of sets of special effect image data automatically in time series.

An image processing method of yet another aspect of the present invention for displaying a live view image obtained by implementing special effect processing on an image data on a monitor comprises a step of implementing a plurality of types of special effect processing on the image data to generate a plurality of sets of special effect image data corresponding respectively to the plurality of types of special effect processing and a step of displaying the plurality of sets of special effect image data on the monitor while switching the plurality of sets of special effect image data automatically in time series.

A storage medium of yet another aspect of the present invention stores an image processing program for displaying a live view image obtained by implementing special effect processing on an image data on a monitor. The image processing program causes a computer to execute a step of implementing a plurality of types of special effect processing on the image data to generate a plurality of sets of special effect image data corresponding respectively to the plurality of types of special effect processing and a step of displaying the plurality of sets of special effect image data on the monitor while switching the plurality of sets of special effect image data automatically in time series.

BRIEF DESCRIPTION OF THE DRAWINGS

FIG. 6 is a view illustrating processing times of various types of special effect processing performed by the image processing apparatus according to this embodiment.

DESCRIPTION OF THE PREFERRED EMBODIMENT

Figure 1:
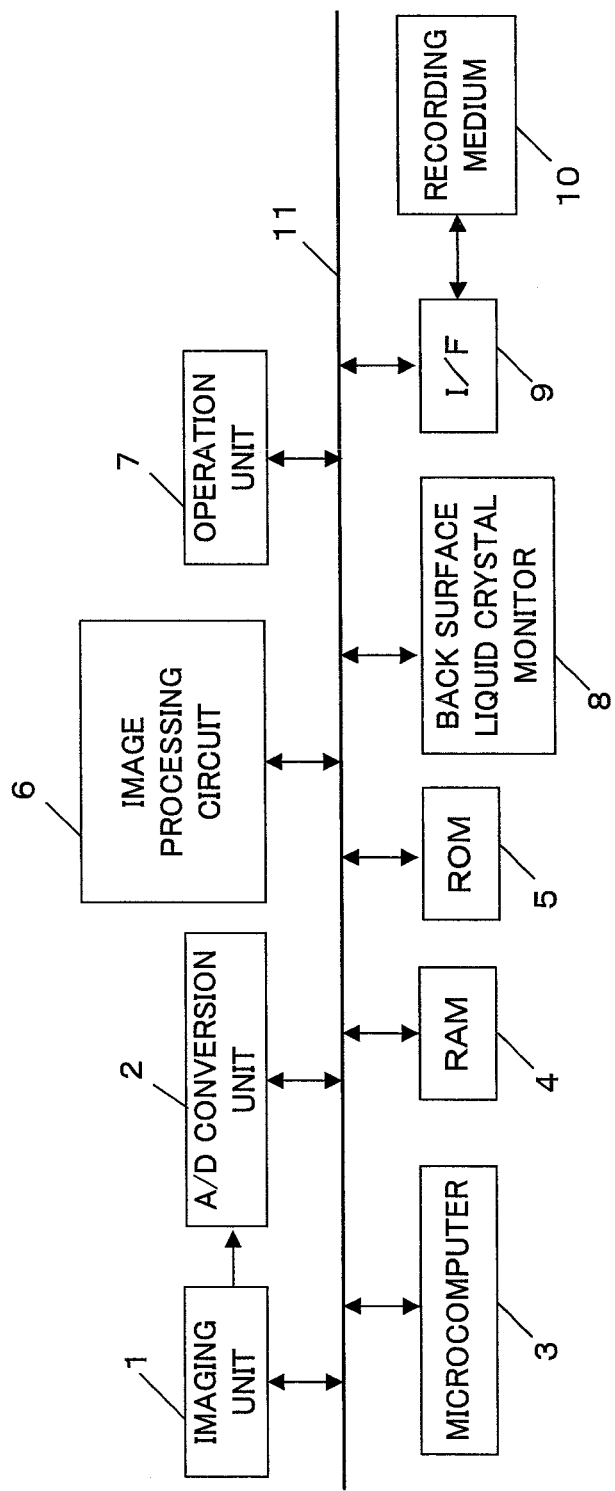
FIG. 1 is a block diagram showing the constitution of a digital camera including an image processing apparatus according to an embodiment.

FIG. 1 is a block diagram showing the constitution of a digital camera including an image processing apparatus according to an embodiment. The digital camera comprises an imaging unit 1, an A/D conversion unit 2, a microcomputer 3, a RAM 4, a ROM 5, an image processing circuit 6, an operation unit 7, a back surface liquid crystal monitor 8, a memory interface 9 (to be referred to as I/F 9 hereafter), and a recording medium 10.

The imaging unit 1 includes a single chip type color image sensor (hereinafter referred to as an "image sensor") in which a plurality of color filters are arranged in front of the photodiodes which constitute each pixel, as well as an imaging optical system and their drive units. For example, the color filters are arranged in a Bayer arrangement. The Bayer arrangement has a type of line in which R pixels and G (Gr) pixels are arranged alternately in a horizontal direction, and a type of line in which G (Gb) pixels and B pixels are arranged alternately, and the two types of lines are also alternately in a perpendicular direction. The image sensor receives the light condensed with the lens (not illustrated) at the photodiode which constitutes a pixel and performs photoelectric conversion of the light, and outputs the amount of the light as an amount of electric charges to the A/D conversion unit 2. It should be noted that the image sensor may be a CCD type or a CMOS type. Moreover, a color filter may be configured in an arrangement other than the Bayer arrangement, and may consist of colors other than R, G, and B.

The A/D conversion unit 2 converts the electric signal output from the imaging unit 1 into a digital image signal (hereinafter referred to as "image data").

The microcomputer 3 is a control unit that performs overall control of the digital camera. For example, the microcomputer 3 performs focal control of the imaging optical system and exposure control of the image sensor in the imaging unit 1, recording control to record the image data in the storage medium 10, and display control to display the image data on the back surface liquid crystal monitor 8. The microcomputer 3 also implements various types of special effect processing on the image data.

The RAM 4 is a memory unit which stores temporally various kinds of data, such as the image data acquired at the A/D conversion unit 2 and the image data processed at the image processing circuit 6, which will be described later. The ROM 5 stores various types of parameters required for the operation of the digital camera, parameters used for special effect processing and various types of programs to be executed on the microcomputer 3. The microcomputer 3 reads from the ROM 5 parameters that are required for various types of sequences and executes each processing according to the program stored in the ROM 5.

The image processing circuit 6 performs various types of image processing to the image data read from the RAM 4. The details of the image processing performed at the image processing circuit 6 will be described later. The image data subjected to image processing at the image processing circuit 6 is recorded in the recording medium 10 via the I/F 9. The recording medium 10 is, for example, a memory card which can be detached from and attached to the body of the digital camera, but it is not limited to this.

The operation unit 7 includes operation members such as a power button, a release button, various types of input keys and so on. The microcomputer 3 performs various types of sequences according to the operation of either of the operation members of the operation unit 7 performed by the user. The power button is an operation member for performing ON/OFF indications of the power of the digital camera. When the power button is pushed, the microcomputer 3 turns on or turns off the power of the digital camera. The release button is arranged to include a two-step switch, which consists of a first release switch and a second release switch. When the release button is half-pushed so that the first release switch is turned on, the microcomputer 3 performs a shooting preparation sequence including AE processing, AF processing and so on. When the release button is fully-pushed so that the second release switch is turned on, the microcomputer 3 performs a shooting sequence to shoot.

The bus 11 is a transfer line for transferring various types of data generated inside the digital camera to each unit in the digital camera. The bus 11 is connected to the imaging unit 1, the A/D conversion unit 2, the microcomputer 3, the RAM 4, the ROM 5, the image processing circuit 6, the operation unit 7, the back surface liquid crystal monitor 8, and the I/F 9.

Figure 2:
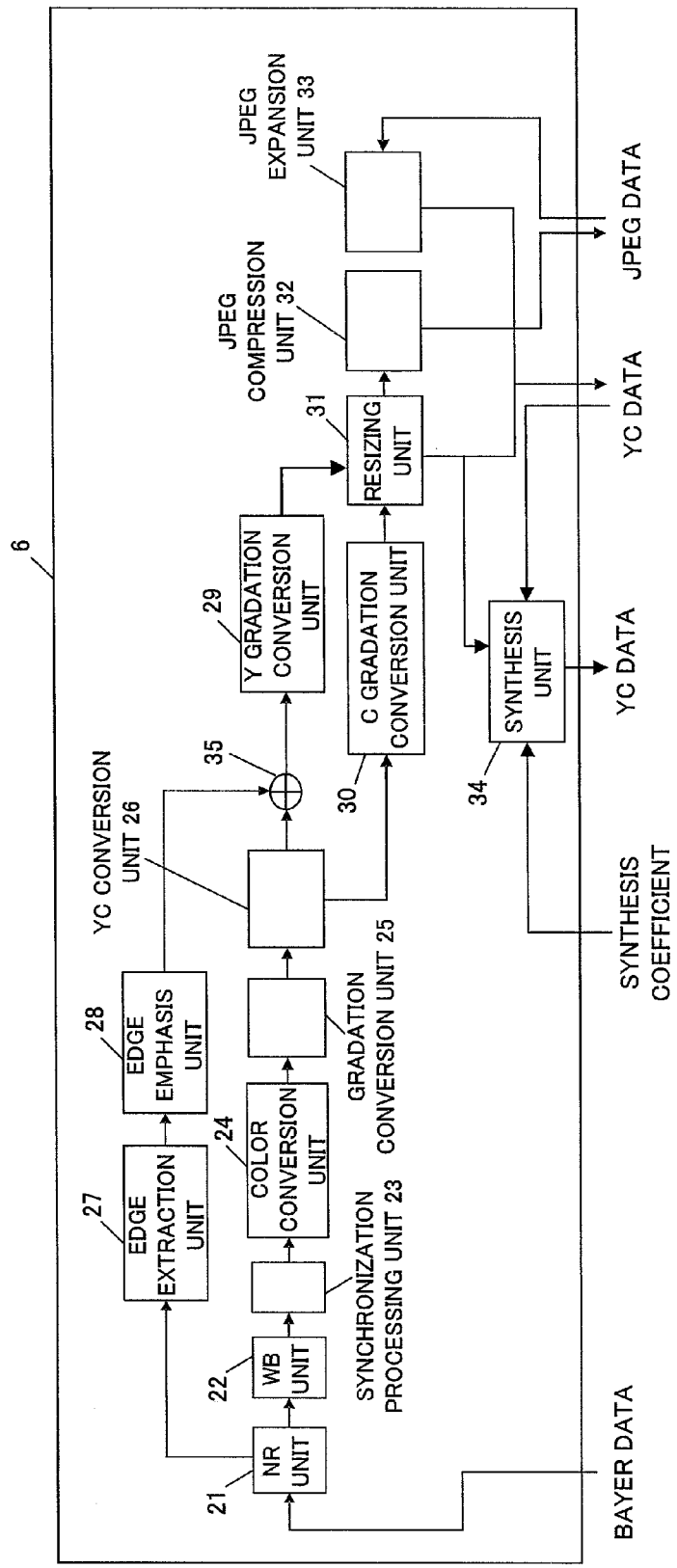
FIG. 2 is a block diagram showing the constitution of the image processing circuit in detail.

FIG. 2 is a block diagram showing the constitution of the image processing circuit 6 in detail. The image processing circuit 6 includes a noise reduction unit (NR unit in the figure) 21, a white balance adjustment unit (WB unit in the figure) 22, a synchronization processing unit 23, a color conversion unit 24, a gradation conversion unit 25, a YC conversion unit 26, an edge extraction unit 27, an edge emphasis unit 28, a Y gradation conversion unit 29, a C gradation conversion unit 30, a resizing unit 31, a JPEG compression unit 32, a JPEG expansion unit 33, a synthesis unit 34, and an addition unit 35.

The noise reduction unit 21 performs noise reduction processing to the image data converted at the A/D conversion unit 2 and stored in the RAM 4. In this noise reduction processing, a pixel defect of the image sensor is corrected, and random noise generated upon the imaging is reduced. However, it may be possible to process at least one type of processing to correct the pixel defect of the image sensor and processing to reduce random noise generated upon the imaging, or another noise reduction processing.

The white balance adjustment unit 22 performs the processing to adjust the white balance of the image data after the noise reduction.

The synchronization processing unit 23 performs processing to synchronize a Bayer arrangement image data into an image data in which R, G, B information is included in each pixel. The synchronized image data are subjected to predetermined color conversion processing in the color conversion unit 24 and then subjected to gradation conversion processing in the gradation conversion unit 25. Here, gradation conversion processing is performed in consideration of a gamma characteristic of the back surface liquid crystal monitor 8 such that dark parts are expanded and light parts are compressed.

Figure 3:
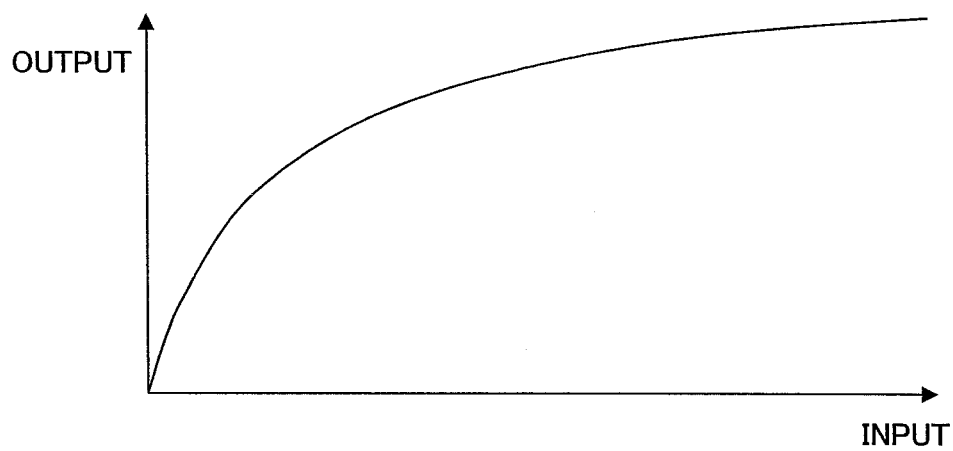
FIG. 3 is a view showing an example of a gradation conversion characteristic employed in the gradation conversion processing of the gradation conversion unit.

FIG. 3 is a view showing an example of a gradation conversion characteristic employed in the gradation conversion processing of the gradation conversion unit 25. A gradation conversion table having a gradation conversion characteristic such as that shown in FIG. 3 is stored in the ROM 5, and the gradation conversion unit 25 reads the gradation conversion table from the ROM 5 in order to perform the gradation conversion processing.

The YC conversion unit 26 converts the image data subjected to the gradation conversion processing into the Y (luminance) signal and the C (color) signal. The converted Y signal is output to the addition unit 35, and the converted C signal is output to the C gradation conversion unit 30.

The edge extraction unit 27 performs the processing to extract the edge from the image data subjected to noise reduction processing at the noise reduction unit 21. The edge emphasis unit 28 performs edge emphasis processing by multiplying the data of the edge extracted in the edge extraction unit 27 by a predetermined gain.

Figure 4:
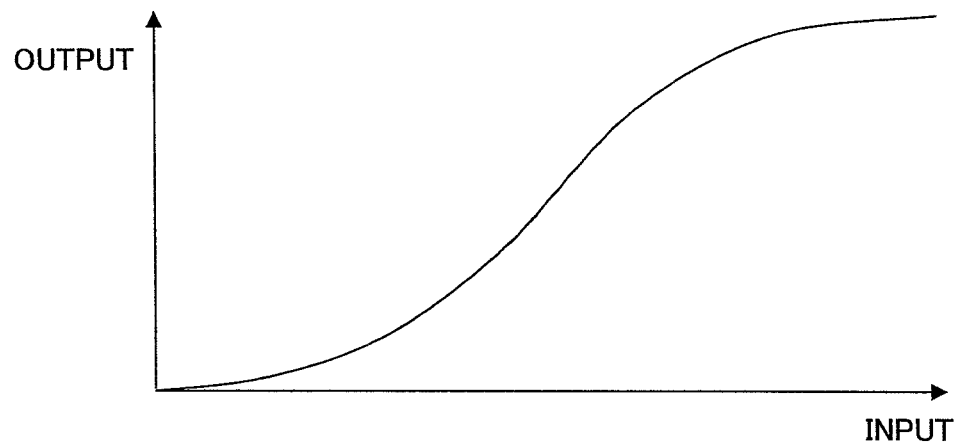
FIG. 4 is a view showing an example of a gradation conversion characteristic employed in the Y signal gradation conversion processing.

The addition unit 35 adds edge data input from the edge emphasis unit 28 to a Y signal output by the YC conversion unit 26. A Y signal output from the addition unit 35 is subjected to gradation conversion processing in the Y gradation conversion unit 29. FIG. 4 is a view showing an example of a gradation conversion characteristic employed in the Y signal gradation conversion processing. This gradation conversion characteristic is set such that a contrast of the image data is emphasized, or in other words such that dark parts and light parts are compressed and intermediate tones are expanded. A gradation conversion table having a gradation conversion characteristic such as that shown in FIG. 4 is stored in the ROM 5, and the Y gradation conversion unit 29 reads the gradation conversion table from the ROM 5 in order to perform the gradation conversion processing.

Figure 5:
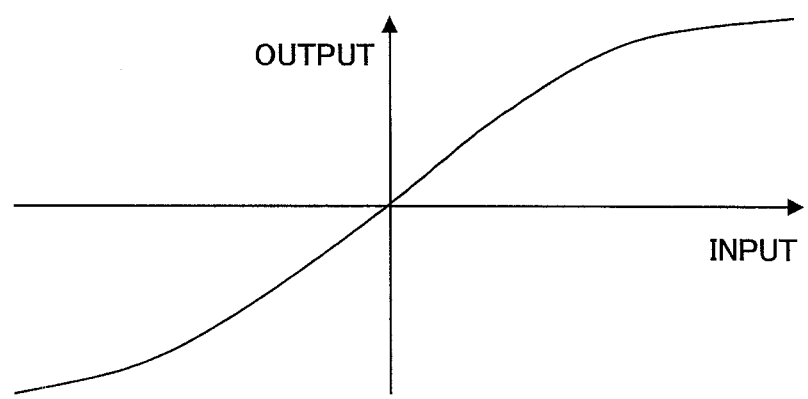
FIG. 5 is a view showing an example of a gradation conversion characteristic employed in the C signal gradation conversion processing.

The C gradation conversion unit 30 performs gradation conversion processing on a C signal. FIG. 5 is a view showing an example of a gradation conversion characteristic employed in the C signal gradation conversion processing. A gradation conversion table having a gradation conversion characteristic such as that shown in FIG. 5 is stored in the ROM 5, and the C gradation conversion unit 30 reads the gradation conversion table from the ROM 5 in order to perform the gradation conversion processing.

The resizing unit 31 resizes the Y signal and the C signal subjected to the gradation conversion processing according to the image size to which the image is recorded. The JPEG compression unit 32 performs JPEG compression to the resized Y signal and C signal. The data subjected to the JPEG compression is recorded to the recording medium 10 via the I/F 9. The JPEG expansion unit 33 reads the JPEG compressed data recorded in the recording medium 10 and performs expansion processing to restore it to the condition before the compression.

The synthesis unit 34 performs processing to synthesize at least two sets of image data stored in the RAM 4. The image data include image data both prior to and following special effect processing to be described below.

FIG. 6 is a view illustrating processing times of various types of special effect processing performed by the image processing apparatus according to this embodiment. Examples of the various types of special effect processing include soft focus processing for appropriately defocusing an image, light tone processing for making an image appear lit, toy photo processing for reducing a peripheral light amount of an image, pop art processing for emphasizing colors to be bright and striking, and rough monochrome processing for reproducing grainy, high-contrast monochrome photographs. Here, a case in which five types of special effect processing are performed will be described.

In the special effect processing, first, hardware processing is performed by the image processing circuit 6, whereupon processing that cannot be realized by hardware processing is performed as software processing by the microcomputer 3. In FIG. 6, "H" indicates the hardware processing performed by the image processing circuit 6, and "S" indicates the software processing performed by the microcomputer 3. The hardware processing is constituted by so-called pipeline processing, and therefore, although processing parameters vary according to the processing content, the processing time does not change. In the software processing, on the other hand, the processing time differs according to the processing content. In the example shown in FIG. 6, special effect processing 1 is performed through hardware processing alone, and therefore has the shortest processing time, whereas special effect processing 5 involves a lengthy software processing period, and therefore has the longest processing time.

In the image processing apparatus according to this embodiment, live view images (also known as through images) subjected to a plurality of types of special effect processing are displayed on the back surface liquid crystal monitor 8. More specifically, five types of special effect processing, i.e. special effect processing 1 to special effect processing 5 shown in FIG. 6, are performed, whereupon live view images resulting from the special effect processing are displayed on the back surface liquid crystal monitor 8 in sequence. The following three patterns (1) to (3) may be employed as a special effect processing sequence.

(1) Special effect processing 1→special effect processing 4→special effect processing 2→special effect processing 3→special effect processing 1→special effect processing 5
(2) Special effect processing 1→special effect processing 5→special effect processing 1→special effect processing 4→special effect processing 1→special effect processing 3→special effect processing 1→special effect processing 2
(3) No special effect processing→special effect processing 1→no special effect processing→special effect processing 2→no special effect processing→special effect processing 3→no special effect processing special effect processing 4→no special effect processing→special effect processing 5

In Patterns (1) to (3) described above, types of special effect processing having a long processing time, for example special effect processing 4 and special effect processing 5 or special effect processing 3 and special effect processing 5, are not performed consecutively. In Pattern (2), for example, an image resulting from special effect processing 1, which has the shortest processing time, is displayed between respective images resulting from special effect processing 2 to special effect processing 5. Further, in Pattern (3), a normally processed image not subjected to special effect processing is displayed between respective images resulting from special effect processing 1 to special effect processing 5. The reason for this, as will be described below, is that when types of special effect processing having a long processing time are performed consecutively, a large amount of time is required to display the live view images exhibiting the special effects.

In this embodiment, an image obtained by synthesizing image data resulting from one type of special effect processing and image data resulting from the next type of special effect processing is displayed on the back surface liquid crystal monitor 8 after displaying special effect image data (a live view image) resulting from the first type of special effect processing and before displaying special effect image data (a live view image) resulting from the next type of special effect processing. For example, when switching from special effect processing 1 to special effect processing 4, an image obtained by synthesizing the special effect image data resulting from special effect processing 1 and the special effect image data resulting from special effect processing 4 is displayed before displaying the special effect image data resulting from special effect processing 4. Thus, the displayed image shifts gradually from a state resulting from special effect processing 1 to a state resulting from special effect processing 4.

Figure 7:
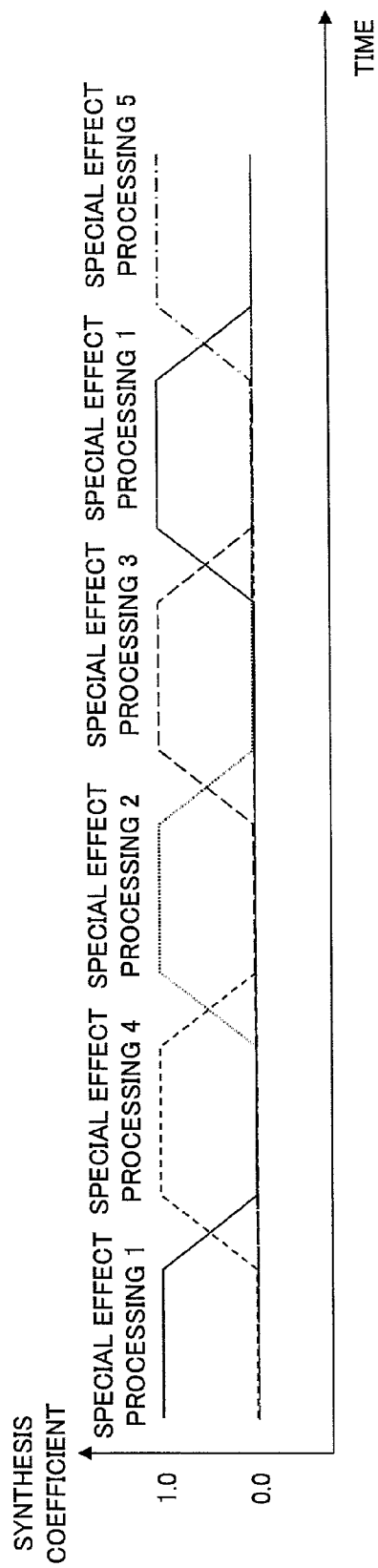
FIG. 7 is a view showing synthesis coefficients employed when generating a synthesized image while switching the special effect processing in Pattern (1).

FIG. 7 is a view showing synthesis coefficients employed when generating a synthesized image while switching the special effect processing in Pattern (1). When the image data resulting from special effect processing 1 are displayed, the synthesis coefficient of special effect processing 1 is 1.0. When switching from special effect processing 1 to special effect processing 4, the synthesis coefficient of special effect processing 1 gradually decreases from 1.0 to 0.0 and the synthesis coefficient of special effect processing 4 gradually increases from 0.0 to 1.0. The synthesis coefficient of special effect processing 4 reaches 1.0 at the same time as the synthesis coefficient of special effect processing 1 reaches 0.0, whereby the switch from special effect processing 1 to special effect processing 4 is complete. When the synthesis coefficients of special effect processing 1 and special effect processing 4 are larger than 0.0 and smaller than 1.0, respectively, an image obtained by synthesizing the images resulting from the respective types of special effect processing is displayed in accordance with the respective synthesis coefficients. Hence, on the synthesized image, the effect of special effect processing 1 is large at first, whereupon the effect of special effect processing 1 gradually decreases and the effect of special effect processing 4 gradually increases.

Figure 8:
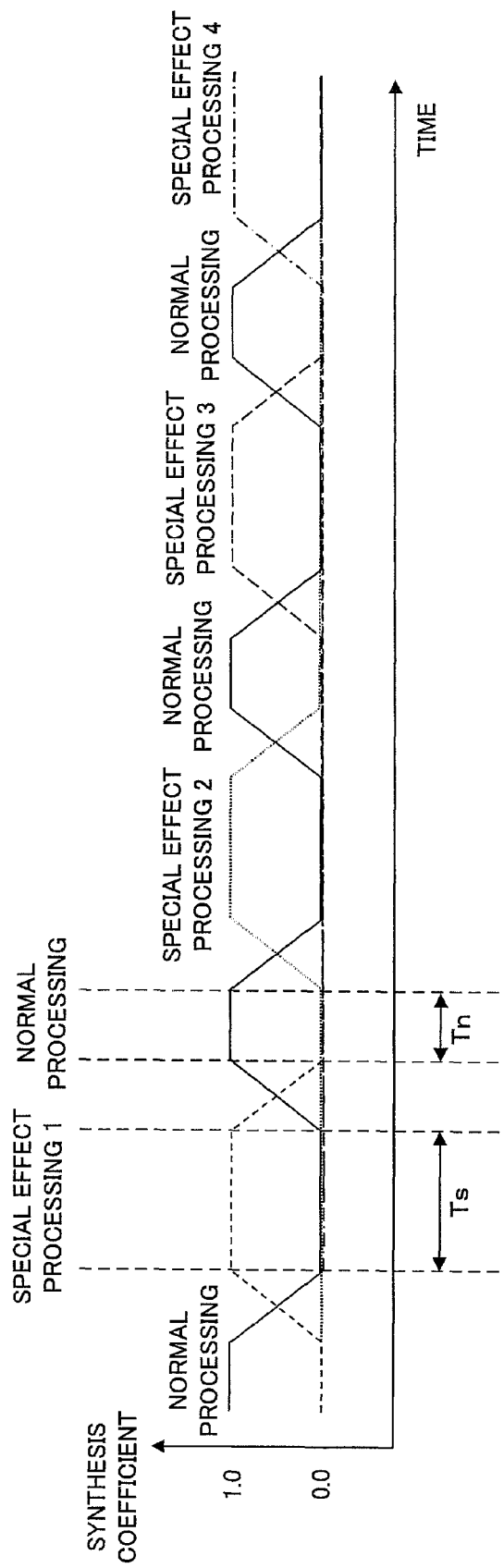
FIG. 8 is a view showing synthesis coefficients employed when generating a synthesized image while switching the special effect processing in Pattern (3).

FIG. 8 is a view showing synthesis coefficients employed when generating a synthesized image while switching the special effect processing in Pattern (3). When normally processed image data not subjected to special effect processing are displayed, the synthesis coefficient of the normal processing is 1.0. When switching from normal processing to special effect processing 1, the synthesis coefficient of the normal processing gradually decreases from 1.0 to 0.0 and the synthesis coefficient of special effect processing 1 gradually increases from 0.0 to 1.0. The synthesis coefficient of special effect processing 1 reaches 1.0 at the same time as the synthesis coefficient of the normal processing reaches 0.0, whereby the switch from the normal processing to special effect processing 1 is complete.

Here, a period Ts in which the synthesis coefficient of the special effect processing is at 1.0 is set to be longer than a period Tn in which the synthesis coefficient of the normal processing is at 1.0. When the image data resulting from the special effect processing are displayed after the image data resulting from the normal processing, the effects of the special effect processing are easier to grasp than in Pattern (1) and Pattern (2), in which images resulting from the special effect processing are displayed consecutively. By making the display period Tn of the image data resulting from the normal processing shorter than the display period Ts of the image data resulting from the special effect processing, a user can grasp the effects of the special effect processing more easily.

Figure 9:
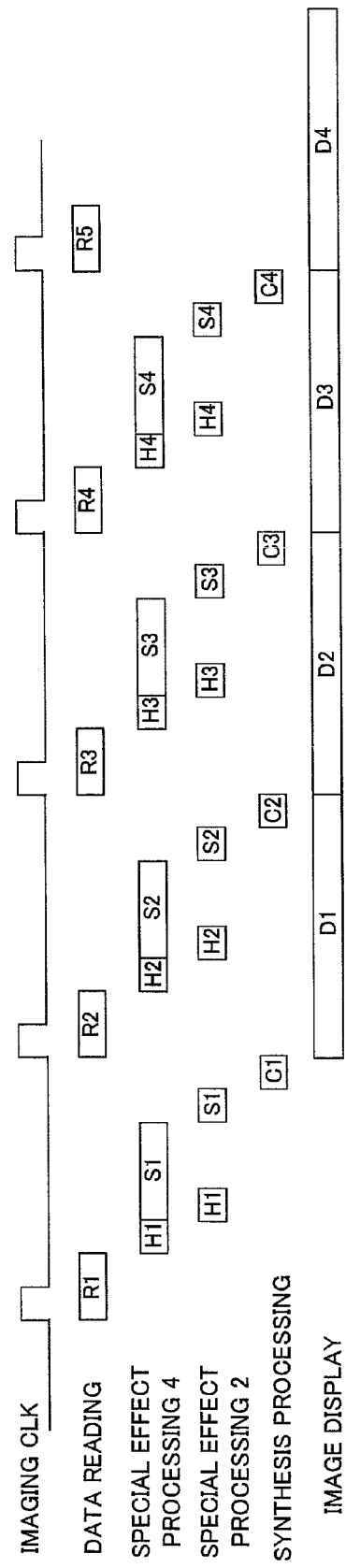
FIG. 9 is a timing chart showing the switch from special effect processing 4 to special effect processing 2 in Pattern (1).

FIG. 9 is a timing chart showing the switch from special effect processing 4 to special effect processing 2 in Pattern (1). An A/D-converted image data are read (denoted as data reading in the figure) in synchronization with an imaging clock (denoted as imaging CLK in the figure). A period of the imaging clock is 1/60 (seconds), for example.

When image data reading processing (R1) is complete, special effect processing 4 is implemented on the read image data first. In special effect processing 4, hardware processing (H1) is implemented first, followed by software processing (S1). At the same time as the software processing (S1) of special effect processing 4 begins, the hardware processing (H1) of special effect processing 2 begins. When the software processing (S1) of special effect processing 4 is complete, the software processing (S1) of special effect processing 2 begins.

Next, processing (C1) is performed to synthesize the image data resulting from special effect processing 4 with the image data resulting from special effect processing 2. The synthesis processing is the processing described above with reference to FIG. 7.

When the synthesis processing (C1) is complete, a synthesized image is displayed on the back surface liquid crystal monitor 8 (D1). Thereafter, the processing from image data reading to image display is performed repeatedly in synchronization with the imaging clock.

Figure 10:
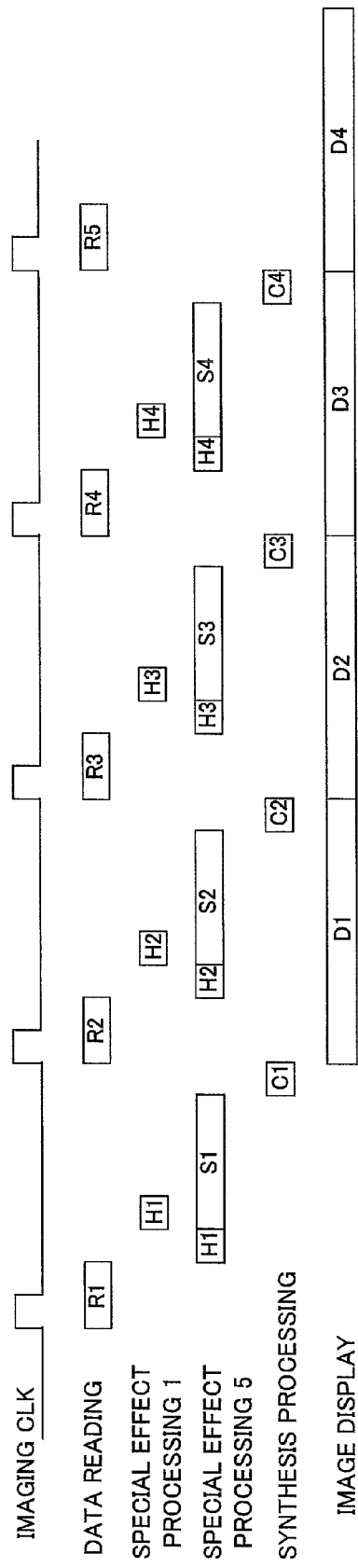
FIG. 10 is a timing chart showing the switch from special effect processing 1 to special effect processing 5 in Pattern (2).

FIG. 10 is a timing chart showing the switch from special effect processing 1 to special effect processing 5 in Pattern (2). It should be noted that a timing chart showing the switch from special effect processing 5 to special effect processing 1 is identical to the timing chart shown in FIG. 10. When the A/D-converted image data have been read (R1) in synchronization with the imaging clock, special effect processing 5 is implemented on the read image data first. In special effect processing 5, the hardware processing (H1) is implemented first, followed by the software processing (S1). At the same time as the software processing (S1) of special effect processing 5 begins, the hardware processing (H1) of special effect processing 1 begins.

By performing special effect processing 5 first, special effect processing 1 can be performed simultaneously with the software processing of special effect processing 5, and therefore both special effect processing 1 and special effect processing 5 can be performed in the time required to complete special effect processing 5. Conversely, when special effect processing 1 is performed before special effect processing 5, special effect processing 5 begins upon completion of special effect processing 1, leading to an increase in processing time.

When special effect processing 5 is complete, processing (C1) is performed to synthesize the image data resulting from special effect processing 1 with the image data resulting from special effect processing 5, whereby a synthesized image is displayed on the back surface liquid crystal monitor 8 (D1). Thereafter, the processing from image data reading to image display is performed repeatedly in synchronization with the imaging clock.

Figure 11:
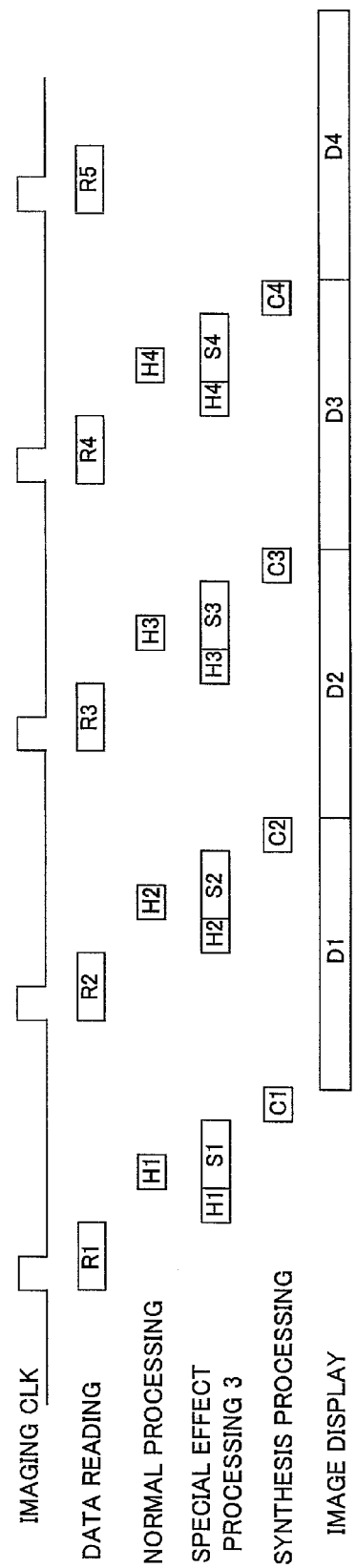
FIG. 11 is a timing chart showing the switch from normal processing, in which special effect processing is not implemented, to special effect processing 3 in Pattern (3).

FIG. 11 is a timing chart showing the switch from normal processing, in which special effect processing is not implemented, to special effect processing 3 in Pattern (3). It should be noted that a timing chart showing the switch from special effect processing 3 to the normal processing is identical to the timing chart shown in FIG. 11. When the A/D-converted image data have been read (R1) in synchronization with the imaging clock, special effect processing 3 is implemented on the read image data first. In special effect processing 3, the hardware processing (H1) is implemented first, followed by the software processing (S1). At the same time as the software processing (S1) of special effect processing 3 begins, the hardware processing (H1) of the normal processing begins.

By performing special effect processing 3 before the normal processing, the normal processing can be performed simultaneously with the software processing of special effect processing 3, and therefore both the normal processing and special effect processing 3 can be performed in the time required to complete special effect processing 3. Conversely, when the normal processing is performed before special effect processing 3, special effect processing 3 begins upon completion of the normal processing, leading to an increase in processing time.

When special effect processing 3 is complete, processing (C1) is performed to synthesize the image data resulting from the normal processing with the image data resulting from special effect processing 3, whereby a synthesized image is displayed on the back surface liquid crystal monitor 8 (D1). Thereafter, the processing from image data reading to image display is performed repeatedly in synchronization with the imaging clock.

As described above using FIGS. 9 to 11, in Patterns (1) to (3), the sequence in which processing is implemented on the image data is determined such that the processing from image data reading to image display on the back surface liquid crystal monitor 8 is completed within a single imaging clock. When types of special effect processing having long processing times, such as special effect processing 4 and special effect processing 5, are performed consecutively, the processing from image data reading to image display on the back surface liquid crystal monitor 8 cannot be completed within a single imaging clock, and therefore these types of special effect processing are not performed successively.

Figure 12:
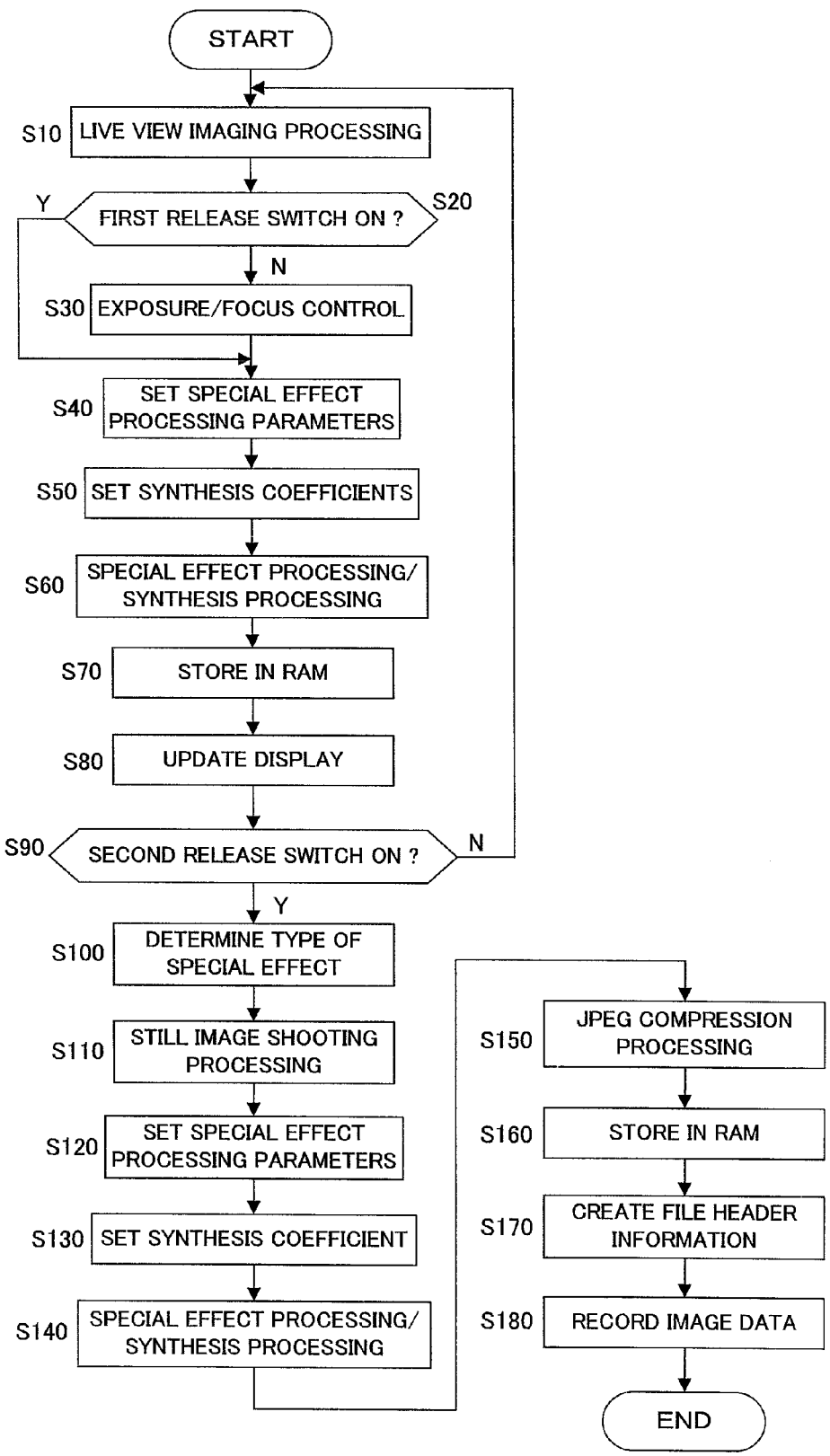
FIG. 12 is a flowchart showing the content of the processing performed by the image processing apparatus according to this embodiment.

FIG. 12 is a flowchart showing the content of the processing performed by the image processing apparatus according to this embodiment. When a live view function is switched ON, the processing of a step S10 begins. As regards the sequence pattern in which the special effect processing is to be implemented, one of Patterns (1) to (3) may be set in advance, or the user may be prompted to select a desired pattern from Patterns (1) to (3).

In the step S10, live view imaging processing is performed. In the live view imaging processing, data are read by thinning out pixels of an imaging device.

In a step S20, a determination is made as to whether or not a first release switch is ON. When it is determined that the user has pressed the first release switch, the routine advances to a step S40, and when the first release switch has not been switched ON, the routine advances to a step S30.

In the step S30, well-known exposure control and focus control are executed.

In the step S40, parameters employed in the special effect processing are set. The ROM 5 stores parameters used respectively in special effect processing 1 to special effect processing 5, and therefore parameters corresponding to the special effect processing to be performed are read from the ROM 5 and set. For example, in the case of Pattern (1), the special effect processing is performed in time sequence from special effect processing 1, as shown in FIG. 7. Therefore, the parameters of the special effect processing are read from the ROM 5 and set in accordance with the elapse of time from the start of the processing.

In a step S50, the synthesis coefficients to be used during the synthesis processing by the synthesis unit 34 are set. As described above using FIGS. 7 and 8, the synthesis coefficients vary over time. The ROM 5 stores data indicating a relationship between the elapse of time following the start of the processing and the synthesis coefficient of each type of special effect processing, and therefore the synthesis coefficients of the respective types of special effect processing are read and set in accordance with the elapse of time following the start of the processing.

In a step S60, special effect processing is performed by the method described above with reference to FIGS. 9 to 11 using the parameters set in the step S40, whereupon synthesis processing is performed on the image data resulting from the special effect processing using the synthesis coefficients set in the step S50. The synthesis processing includes processing for performing synthesis with respective synthesis coefficients of 0.0 and 1.0.

In a step S70, the synthesized image data are stored in the RAM 4. In a step S80, the display on the back surface liquid crystal monitor 8 is updated by displaying the image data stored in the RAM 4 on the back surface liquid crystal monitor 8. As a result, a live view image resulting from the special effect processing is displayed.

In a step S90, a determination is made as to whether or not a second release switch is ON. When it is determined that the second release switch is not ON, the routine returns to the step S10, where the processing up to the step S80 is repeated. In other words, live view images resulting from the special effect processing are displayed continuously until the second release switch is switched ON. When it is determined that the user has switched the second release switch ON, on the other hand, the routine advances to a step S100.

In the step S100, the type of special effect to be implemented on the image data obtained through shooting is determined. A method of determining a type of special effect will be described below.

Images resulting from the various types of special effect processing are displayed one by one on the back surface liquid crystal monitor 8, and when an image resulting from special effect processing that the user wishes to apply is displayed, the user presses the second release switch. For example, when the user presses the second release switch while image data resulting from special effect processing 4 are displayed on the back surface liquid crystal monitor 8, the special effect relating to special effect processing 4 is determined to be the type of special effect to be implemented on the image data obtained through shooting. Further, when the user presses the second release switch while a synthesized image of two sets of image data is displayed, special effects relating to two types of special effect processing are determined to be implemented on the image data obtained through shooting.

In a step S110, still image shooting processing is performed. In the live view imaging processing of the step S10, data are read by thinning out the pixels of the imaging device, but here, data obtained from all pixels are read.

In a step S120, the parameters corresponding to the special effect processing determined in the step S100 are set. As described above, the ROM 5 stores parameters used respectively in special effect processing 1 to special effect processing 5, and therefore the parameters that correspond to the special effect processing determined in the step S100 are read from the ROM 5 and set. When two types of special effect processing are determined in the step S100, the parameters corresponding to the two types of special effect processing are read respectively from the ROM 5 and set.

In a step S130, the synthesis coefficient to be used during synthesis processing by the synthesis unit 34 is set. When a single type of special effect processing is determined in the step S100, the synthesis coefficient is set at 1.0. When two types of special effect processing are determined in the step S100, on the other hand, the synthesis coefficients at the point where the user presses the second release switch are set. For example, in a case where the second release switch is pressed while a synthesized image in which the synthesis coefficient of special effect processing 1 is 0.7 and the synthesis coefficient of special effect processing 4 is 0.3 is displayed on the back surface liquid crystal monitor 8, the synthesis coefficient of special effect processing 1 and the synthesis coefficient of special effect processing 4 are set at 0.7 and 0.3, respectively.

In a step S140, special effect processing is performed using the parameters set in the step S120, whereupon synthesis processing is performed on the image data resulting from the special effect processing using the synthesis coefficients set in the step S130. When a single type of special effect processing is determined in the step S100, a single set of image data (with a synthesis coefficient of 1.0) is subjected to synthesis, and therefore, in actuality, the synthesis processing is not performed.

In a step S150, the JPEG compression unit 32 performs JPEG compression on the image data following completion of the processing of the step S140. In a step S160, the JPEG-compressed image data are stored in the RAM 4.

In a step S170, shooting information such as a recording mode and exposure conditions of the image is created as file header information. In a step S180, the created file header information is attached to the image data stored temporarily in the RAM 4 following JPEG compression, whereupon the image data are recorded in the recording medium 10 via the I/F 9.

With the image processing apparatus according to the embodiment described above, a plurality of sets of special effect image data corresponding respectively to a plurality of types of special effect processing are generated by implementing the respective types of special effect processing on live view image data. The generated plurality of special effect image data are switched automatically in time series and displayed on the back surface liquid crystal monitor 8. Thus, the plurality of special effect image data can be displayed on the back surface liquid crystal monitor 8 without being compressed, and therefore the user can check the plurality of types of special effect processing reliably and easily.

When display switching is performed in Pattern (3), the normal image data not subjected to special effect processing are displayed for a predetermined amount of time before switching to the next set of special effect image data, and therefore the special effects can be checked more easily than in a case where the special effect image data are displayed consecutively. In particular, the display time of the normal image data is set to be shorter than the display time of the special effect image data, and therefore the user can check the special effects even more reliably.

Further, when the display on the back surface liquid crystal monitor 8 is switched from the normal image data to the special effect image data, the special effect image data are displayed after displaying synthesized image data obtained through weighted synthesis of the special effect image data and the normal image data, and therefore the user can check the special effects even more reliably.

With the image processing apparatus according to the embodiment described above, the sequence in which the plurality of types of special effect processing are performed is determined such that the time required to implement the plurality of types of special effect processing remains within a predetermined range. Therefore, a situation in which the special effect processing requires a large amount of time, leading to a delay in the display of the special effect image data resulting from the special effect processing, can be avoided.

In the above description of the embodiment, it is assumed that the processing performed by the image processing apparatus is hardware processing, but this invention need not be limited to such a constitution. For example, a constitution in which the processing is performed by software may be employed. In this case, the image processing apparatus includes a CPU, a main storage device such as a RAM, and a computer-readable storage medium storing a program for realizing all or a part of the processing described above. Here, the program is referred to as an image processing program. By having the CPU read the image processing program stored on the storage medium and execute information processing/calculation processing, similar processing to that of the image processing apparatus described above is realized.

The computer readable storage medium is, for example, a magnetic disc, magnetic optical disc, a CD-ROM, a DVD-ROM or a semiconductor memory. The above image processing program may be transmitted to the computer via communication lines, and the computer may execute the received image processing program.

This invention is not limited to the embodiment described above, and may be subjected to various amendments and applications within a scope that does not depart from the spirit thereof. For example, in the flowchart of FIG. 12, when the second release switch is pressed while a synthesized image of two sets of image data is displayed on the back surface liquid crystal monitor 8, the special effects relating to two types of special effect processing are determined to be the special effects to be implemented on the image data obtained through shooting. In another constitution, however, only the special effect processing having the larger synthesis coefficient at the point when the second release switch is pressed is implemented on the image data obtained through shooting. In this case, if the second release switch is pressed when the synthesis coefficients are both 0.5, it may be determined that the special effect processing which has already been displayed has been selected. For example, if the second release switch is pressed when both synthesis coefficients are 0.5 during a switch from special effect processing 1 to special effect processing 4, the special effect relating to special effect processing 1 is determined to be the special effect to be implemented on the image data obtained through shooting.

In the above embodiment, an example in which the image processing apparatus is applied to a digital camera was described. However, this invention may also be applied to a constitution in which previously photographed image data are stored in a storage device and a computer serving as the image processing apparatus reads the image data from the storage device, implements the plurality of types of special effect processing, and displays the plurality of special effect image data on a monitor while switching the image data automatically in time series.

The special effect processing to be implemented on the image data to be displayed on the back surface liquid crystal monitor 8 in time series may include all of the types of special effect processing provided in the digital camera or types of special effect processing specified by the user.

The sequence in which the special effect processing is implemented is not limited to Patterns (1) to (3). However, the sequence in which the plurality of types of special effect processing is performed is preferably determined such that the time required to implement the plurality of types of special effect processing is within the predetermined range.

This application claims priority based on JP2009-64549, filed with the Japan Patent Office on Mar. 17, 2009, the entire contents of which are incorporated into this specification by reference.

What is claimed is:

1. An image processing apparatus for displaying a live view image obtained by implementing special effect processing on an image data on a monitor, comprising:
   an image processing unit that applies a plurality of different types of special effect processing on the image data to generate a plurality of different sets of special effect image data corresponding respectively to the plurality of different types of special effect processing; and
   a control unit that displays the plurality of different sets of special effect image data on the monitor while switching the plurality of different sets of special effect image data automatically in time series,
   wherein the control unit displays (A) a same special effect image data or (B) an image data without special effect processing before switching to a subsequent set of special effect image data during an automatic switch of the plurality of different sets of special effect image data in time series.

2. The image processing apparatus as defined in claim 1, wherein the image processing unit generates normal image data by subjecting the image data to normal processing, in which the special effect processing is not applied, and
   wherein the image data without special effect processing is the normal image data.

3. The image processing apparatus as defined in claim 2, wherein the predetermined amount of time is shorter than a display time of the special effect image data.

4. The image processing apparatus as defined in claim 2, further comprising a synthesis unit that generates synthesized image data by applying weighted synthesis on the special effect image data and the normal image data,
   wherein the control unit displays the special effect image data after displaying the synthesized image data when switching the display on the monitor from the normal image data to the special effect image data.

5. The image processing apparatus as defined in claim 3, further comprising a synthesis unit that generates synthesized image data by applying weighted synthesis on the special effect image data and the normal image data,
   wherein the control unit displays the special effect image data after displaying the synthesized image data when switching the display on the monitor from the normal image data to the special effect image data.

6. The image processing apparatus as defined in claim 2, further comprising a synthesis unit that generates synthesized image data by applying weighted synthesis on the special effect image data and the normal image data,
  wherein the control unit displays the normal image data after displaying the synthesized image data when switching the display on the monitor from the special effect image data to the normal image data.

7. The image processing apparatus as defined in claim 3, further comprising a synthesis unit that generates synthesized image data by applying weighted synthesis on the special effect image data and the normal image data,
  wherein the control unit displays the normal image data after displaying the synthesized image data when switching the display on the monitor from the special effect image data to the normal image data.

8. The image processing apparatus as defined in claim 4, further comprising a special effect processing determination unit that determines a type of special effect processing to be applied on a photographed image on the basis of a synthesis ratio at a timing at which a user issues an instruction during display of the synthesized image data on the monitor.

9. The image processing apparatus as defined in claim 5, further comprising a special effect processing determination unit that determines a type of special effect processing to be applied on a photographed image on the basis of a synthesis ratio at a timing at which a user issues an instruction during display of the synthesized image data on the monitor.

10. The image processing apparatus as defined in claim 6, further comprising a special effect processing determination unit that determines a type of special effect processing to be applied on a photographed image on the basis of a synthesis ratio at a timing at which a user issues an instruction during display of the synthesized image data on the monitor.

11. The image processing apparatus as defined in claim 7, further comprising a special effect processing determination unit that determines a type of special effect processing to be applied on a photographed image on the basis of a synthesis ratio at a timing at which a user issues an instruction during display of the synthesized image data on the monitor.

12. The image processing apparatus as defined in claim 1, wherein the image processing unit generates two or more sets of special effect image data by applying two or more types of special effect processing on the image data, the image processing apparatus further comprises:
  a synthesis unit that generates synthesized image data by applying weighted synthesis on the two or more sets of special effect image data, and
  the control unit that displays the synthesized image data when switching the display on the monitor between the two or more sets of special effect image data.

13. The image processing apparatus as defined in claim 12, further comprising a special effect processing determination unit that determines a type of special effect processing to be applied on a photographed image on the basis of a synthesis ratio at a timing at which a user issues an instruction during display of the synthesized image data on the monitor.

14. The image processing apparatus as defined in claim 12, wherein the control unit determines a sequence in which the plurality of different types of special effect processing are to be performed such that a time required by the image processing unit to apply the plurality of different types of special effect processing remains within a predetermined range.

15. The image processing apparatus as defined in claim 13, wherein the control unit determines a sequence in which the plurality of different types of special effect processing are to be performed such that a time required by the image processing unit to apply the plurality of types of special effect processing remains within a predetermined range.

16. The image processing apparatus as defined in claim 8, wherein the special effect processing determination unit determines a timing at which a release switch is pressed during display of the synthesized image data on the monitor to be the timing at which the user issues the instruction.

17. The image processing apparatus as defined in claim 9, wherein the special effect processing determination unit determines a timing at which a release switch is pressed during display of the synthesized image data on the monitor to be the timing at which the user issues the instruction.

18. The image processing apparatus as defined in claim 10, wherein the special effect processing determination unit determines a timing at which a release switch is pressed during display of the synthesized image data on the monitor to be the timing at which the user issues the instruction.

19. The image processing apparatus as defined in claim 11, wherein the special effect processing determination unit determines a timing at which a release switch is pressed during display of the synthesized image data on the monitor to be the timing at which the user issues the instruction.

20. The image processing apparatus as defined in claim 13, wherein the special effect processing determination unit determines a timing at which a release switch is pressed during display of the synthesized image data on the monitor to be the timing at which the user issues the instruction.

21. The image processing apparatus as defined in claim 1, wherein the same special effect image data has the shortest processing time among the plurality of different sets of special effect image data.

22. An imaging apparatus comprising:
  an imaging unit that obtains an image data by photographing an object;
  a display unit that displays the image data;
  an image processing unit that applies a plurality of different types of special effect processing on the photographed image data to generate a plurality of different sets of special effect image data corresponding respectively to the plurality of different types of special effect processing; and
  a control unit that displays the plurality of sets of special effect image data on the display unit while switching the plurality of different sets of special effect image data automatically in time series,
  wherein the control unit displays (A) a same special effect image data or (B) an image data without special effect processing before switching to a subsequent set of special effect image data during an automatic switch of the plurality of different sets of special effect image data in time series.

23. An image processing method for displaying a live view image obtained by applying special effect processing on an image data on a monitor, comprising:
  a step of applying a plurality of different types of special effect processing on the image data to generate a plurality of different sets of special effect image data corresponding respectively to the plurality of different types of special effect processing; and
  a step of displaying the plurality of different sets of special effect image data on the monitor while switching the plurality of different sets of special effect image data automatically in time series,
  wherein the step of displaying displays (A) a same special effect image data or (B) an image data without special effect processing before switching to a subsequent set of special effect image data during an automatic switch of the plurality of different sets of special effect image data in time series.

24. A non-transitory storage medium storing an image processing program for displaying a live view image obtained by applying special effect processing on an image data on a monitor, the image processing program causes a computer to execute:
- a step of applying a plurality of different types of special effect processing on the image data to generate a plurality of different sets of special effect image data corresponding respectively to the plurality of different types of special effect processing; and
- a step of displaying the plurality of different sets of special effect image data on the monitor while switching the plurality of different sets of special effect image data automatically in time series,
- wherein the step of displaying displays (A) a same special effect image data or (B) an image data without special effect processing before switching to a subsequent set of special effect image data during an automatic switch of the plurality of different sets of special effect image data in time series.

* * * * *